US005745674A

United States Patent [19]
Lupton et al.

[11] Patent Number: 5,745,674
[45] Date of Patent: Apr. 28, 1998

[54] MANAGEMENT OF UNITS OF WORK ON A COMPUTER SYSTEM LOG

[75] Inventors: Peter James Lupton; Robert Frank Buxton, both of Chandlers Ford; Ian Hunter, Winchester; Handel Glasnant Price, Chandlers Ford; Adam Richards, Southampton; John Simon Tilling, Eastleigh; Dennis Jack Zimmer, Chandlers Ford, all of United Kingdom

[73] Assignee: International Business Machines Corp., Armonk, N.Y.

[21] Appl. No.: 657,507

[22] Filed: Jun. 4, 1996

[30] Foreign Application Priority Data

Jun. 7, 1995 [GB] United Kingdom ............ 9511512

[51] Int. Cl.$^6$ ........................................ G06F 11/14
[52] U.S. Cl. .......................................... 395/182.18
[58] Field of Search ........................ 395/182.18, 182.17, 395/618, 671

[56] References Cited

U.S. PATENT DOCUMENTS

| | | | |
|---|---|---|---|
| 4,159,517 | 6/1979 | Paradine et al. | 395/877 |
| 4,752,910 | 6/1988 | Yen et al. | 395/608 |
| 4,878,167 | 10/1989 | Kapulka et al. | 395/182.14 |
| 5,140,689 | 8/1992 | Kobayashi | 395/182.18 |
| 5,165,031 | 11/1992 | Pruul et al. | 395/183.01 |
| 5,327,532 | 7/1994 | Ainsworth et al. | 395/200.78 |
| 5,524,205 | 6/1996 | Lomet et al. | 395/182.14 |

FOREIGN PATENT DOCUMENTS 0-402-542-A1 12/1990 European Pat. Off. ........ G06F 11/14

OTHER PUBLICATIONS

Liu et al., "The Performance of Two–Phase Commit Protocols in the Presence of Site Failures", IEEE, pp. 234–243, 1994.

Lyon, "Tandem's Remote Data Facility", IEEE, pp. 562–567, 1990.

Crus, "Data Recovery in IBM Database 2", IBM Systems Journal, vol. 23, No. 2, pp. 178–188, 1984.

*Primary Examiner*—Robert W. Beausoliel, Jr.
*Assistant Examiner*—Stephen C. Elmore
*Attorney, Agent, or Firm*—Jeanine S. Ray-Yarletts

[57] ABSTRACT

A method of moving records, stored on a recovery log, which are associated with units of work which have waited for a long time is described. Units of work which have waited for a long time, such as those which are in-doubt have their records copied from a recovery log to a secondary log. When the earliest-written record for this in-doubt unit of work has been copied, a new record called a fork record is written on to the recovery log which has two effects: to subtract the log records currently on the recovery log for this unit of work from the recovery log and to refer to the copied records written on the secondary log. The new record achieves this using two pointers, a pointer to point to the most-recently written record on the recovery log for this unit of work and a pointer to point to the most-recently written record on the secondary log for this unit of work.

18 Claims, 5 Drawing Sheets

MANAGEMENT OF UNITS OF WORK ON A COMPUTER SYSTEM LOG

FIELD OF THE INVENTION

The present invention relates to the field of data processing, more specifically to transaction processing systems, and in particular to management of units of work on a computer system log which remain active for long periods of time.

BACKGROUND

An online data processing system requires mechanisms that, together with suitable operating procedures, provide automatic recovery from failures and allow the system to restart with as little disruption as possible. The two main recovery requirements of an online system are to maintain the integrity of data and to minimize the effect of failures.

To maintain the integrity of the data means that the data is in the form expected and has not been corrupted. The whole object of recovery operations on files, databases, and similar data resources, hereinafter referred in this specification as "resources", is to maintain, and restore, the integrity of the information. Ideally, it should be possible to restore the data to a consistent, known, state following any type of failure, with a minimum loss of previous valid updating activity.

One way of doing this is to keep a record, or log, of all the changes made to a resource while the system is executing normally. If a failure occurs, the logged information can help recover the data.

The logged information can be used to reverse incomplete or invalid changes to one or more resources. This is called backward recovery, or "backout". The changes made are to data elements, which are portions of the complete resource. Typically, a data element is a record, which forms part of a file, database or similar data resource. For backout, it is necessary to record the contents of a data element before it is changed. These records are called "before images" and are copies of only the data element which has been changed. In general, backout is applicable to processing failures that prevent one or more transactions (or a batch program) from completing.

The logged information can also be used to reconstruct changes to a resource, starting with a backup copy of the resource taken earlier. The backup copy is a copy of the entire resource, rather than just a copy of a data element. This is called forward recovery. For forward recovery, it is necessary to record the contents of a data element after it is changed. These records are called "after images" and are copies of only the data element which has changed. In general, forward recovery is applicable to data set failures, or failures in similar data resources, that cause data to become unusable because it has been corrupted or because the physical storage medium has been damaged.

In a transaction processing system, more than one transaction may read or cause changes to a single data file. It is important that transactions read valid data and that their updates are correctly recorded in order to preserve data integrity. To preserve data integrity, each transaction must have four key characteristics, Atomicity, Consistency, Isolation and Durability, known collectively by their initial letters as ACID.

Atomicity means that a transaction must be accomplished as a whole or not at all. If a transaction cannot be completed in its entirety, all its effects must be undone. This requires a backout or backward recovery facility in the transaction processing system.

Consistency means ensuring that the results of a transaction are reproducible and predictable. The transaction must always give the same results in the same conditions. This is achieved by program and code design, using such techniques as reusability and reentrancy to ensure that the same code is executed at each invocation of a transaction. An example of where particular care must be taken to ensure consistency is where two records are to be updated. Updating of a first record, followed by updating of a second record should have the same effect as updating of the second record, followed by updating of the first record, that is the order of the updates should not affect the end results achieved by the updates.

Isolation means that no transaction must interfere with any concurrently executing transaction. This is achieved by concurrency control. Several concurrently running transactions can update different records in the same data set. An efficient means of sharing the dataset needs to be provided in order to allow this concurrent updating to occur. The same record must not be updated by two transactions at the same time, that is a transaction must complete an update on a record before any other transaction is allowed to start an update on that record. The use of locking as a method of sharing achieves concurrency control. A lock is a mechanism by which use of a resource is restricted to the holder of the lock. A transaction requests the lock for a data set or for a record of that data set from the manager of that data set. The mechanism by which the lock is implemented may be a flag associated with the data set or a flag associated with each record in the data set. Once a transaction receives that lock then no other transaction may update the data set or the record for which the lock was received.

Durability means that the results of a transaction must be permanent. Durability is achieved by the forward recovery process mentioned above. When a transaction has been committed (that is, it is to be made permanent or irreversible), then an image of the records changed by the transaction (an after image) is taken. If a data set failure occurs at a time after the transaction has been committed, such that a backup copy of the data set has to be used to replace the lost data set, then the after image of the records which were updated can be used to reinstate the updates made by the transaction.

Committing a change means making it permanent or irreversible. A single transaction can update more than one data set managed by one or more resource managers. These updates are usually logically related and data integrity is lost if one update succeeds whilst another fails. If data integrity is to be maintained, then the resource managers must be capable of either performing (committing) all the updates together when the transaction signals successful completion or of backing out all of the updates if the transaction fails. This requires commitment control, which must include a means of backing out all of the updates made by a transaction, such as a backward recovery facility, described above. Commitment procedures may be single phase commit or two phase commit (2PC). If only a single resource manager is involved in the commit process, only a single operation is necessary to commit all of the changes associated with a transaction.

If two or more resource managers are involved in a single transaction, then a commit process having two phases is used (two phase commit or 2PC). In the first phase, each resource manager is asked by an initiator to prepare to commit. Each of the resource managers indicate whether they are prepared to commit.

In the second phase, if all the resource managers have signalled that they are prepared to commit, then each resource manager is asked to commit, otherwise each resource manager is asked to backout.

In the simplest implementation of a two phase commit protocol, the decision to commit or to backout updates is taken when a transaction completes successfully or when it fails. It is helpful to application design if updates are arranged so that there is consistency of data at other logical points during the execution of the transaction. All such points of data consistency (including transaction termination) are called commit points or sync points.

A sync point is taken at the end of every transaction. Whenever a sync point is taken, the system goes through a two phase commit protocol to ensure consistency of data. An application can explicitly request a sync point to be taken at any point in a transaction. An interrupted transaction can be restarted from its last sync point.

The processing between sync points is called a "unit of work". If any of the data changes in a unit of work are not successfully completed, then all of them are reversed (backed out). When changes are committed, as a result of successful completion of the two phase commit protocol performed during a sync point, they are not backed out after a subsequent failure of the transaction or of the system. Any locks held by the transaction are released by the transaction at the end of a unit of work since the data with which the lock has been associated is now in a consistent state.

The logged information, or records, placed sequentially on the log by many concurrently executing units of work include the before images and after images mentioned earlier. The information also includes an indication in one of these images that this image is the first record placed on the log by this unit of work. Records are also placed on the log at each phase of every occurrence of a two phase commit protocol. Since the records are placed on the log sequentially, the records of any one unit of work are intermixed with the records of many other units of work. Each record includes an identifier as to which unit of work it is associated with.

In the event that backout of the changes made by a unit of work is required by means of backward recovery, the process of backout must access all of the log records placed on the log by the unit of work requiring to be backed out and must use the before images to undo the changes made to the data by the unit of work.

If a unit of work waits for a long time without completing, there may be very many log records placed on the log between the time at which the first record was placed on the log by the unit of work and the time when the backout process for that unit of work starts. Each of these records must be examined to see if they relate to the unit of work whose changes are being backed out. This examination of records continues until a record associated with the unit of work and identified as being the first record which this unit of work placed on the log is found. This examination results in an increase in the time needed to restart the system in the event of a failure of the system.

U.S. Pat. No. 4,878,167 entitled "Method for Managing Reuse of Hard Log Space by Mapping Log Data During State CHanges and Discarding the Log Data", assigned to International Business Machines Corporation, discloses the provision of a separate log for each unit of work. When a unit of work requires backing out, then only the records from the log for that unit of work need be read and backed out. This solution has the disadvantages that it provides a lower level of performance and is less easily managed by the system. The performance provided is lower because in a conventional log where the units of work share a log, writing of data to non-volatile storage may occur in blocks with records for a number of units of work sharing blocks to be written, with consequent saving in accesses to relatively slow non-volatile storage and hence improved performance. Such a system is clearly less manageable with the use of multiple logs, in place of the use of just a single log. Identification of the correct log to use, backing up of the log and many other tasks become more complex.

Another prior art solution involves continually copying data which has been updated by units of work which have waited for a long time without completing from memory onto the log, in effect replicating the earlier before images placed on the log. This data is copied to a position at the most recent end of the log. In this way the records containing the earlier before images do not disappear among the records for units of work which have completed. This solution does not work satisfactorily for many applications because the data which is to be copied is not stored in fast accessible volatile memory, but is stored on slower access non-volatile storage such as a Direct Access Storage Device (DASD). In addition processor time is used to perform the copying of data from memory or DASD to the log. Such actions result in a significant performance degradation.

SUMMARY OF THE PRESENT INVENTION

Accordingly the invention provides a method of managing records, associated with units of work, on a recovery log, the method comprising the steps of: for each unit of work having records stored on the recovery log, checking whether that unit of work is in an in-doubt state; for each of said units of work which is in an in-doubt state; scanning the recovery log for records associated with said in-doubt unit of work; on finding a record associated with said in-doubt unit of work, copying said record to a secondary recovery log; on finding the earliest-written record for said in-doubt unit of work, writing a further record on to the recovery log, associated with said in-doubt unit of work, the record having the effects of subtracting the log records currently on the recovery log associated with the in-doubt unit of work from the recovery log and of referring to the copied log records associated with the in-doubt unit of work written on the secondary log.

This provides the advantage that each unit of work does not require a separate log. It also has the advantage that it is not necessary to read a large number of log records in order to locate records associated with a unit of work which had been waiting a considerable amount of time to complete.

In a preferred embodiment the effect of subtracting the log records is by means of a pointer to the most-recently written record associated with said in-doubt unit of work on said recovery log; and the effect of referring to the copied log records is by means of a pointer to the most-recently written record associated with said in-doubt unit of work on said secondary log. The use of a pointer means that the log records currently on the recovery log associated with the in-doubt unit of work remain on the recovery log. This makes it possible to achieve the effects of subtracting the log records and of referring to the secondary log within a single atomic operation, thus ensuring the integrity of the log at all times.

The method of the present invention may also be applied to any unit of work which has continued for a long duration.

Another example of a unit of work, which will have been waiting for a long duration is a backout failure unit of work. A unit of work may be regarded as being in-doubt because the unit of work has suffered a backout failure, due to non-availability of one of a plurality of resources requiring updates to be backed out. The part of the unit of work associated with the resource which was successfully backed out has backout completed, the part of the unit of work associated with the resource which has not successfully been backed out is in-doubt. The entire unit of work is regarded as being in-doubt, and the existing log records can be re-used to identify which parts of the unit of work's records can be treated as having been moved, and which parts treated as not having been moved.

The invention also provides a data processing apparatus for managing records, stored on a recovery log, the apparatus comprising: a recovery log for storing records, the records being associated with a unit of work; means for checking which units of work are in an in-doubt state; means, responsive to the checking means, for processing records associated with units of work which are in an in-doubt state, the means for processing comprising; means for scanning the recovery log for records associated with said in-doubt unit of work; means, responsive to said scanning means, for copying said record to a secondary recovery log; means for finding the earliest-written record for said in-doubt unit of work; means, responsive to said finding means, for writing a further record on to the recovery log, associated with said in-doubt unit of work, the record having a pointer to a most-recently written record associated with said in-doubt unit of work on said recovery log and a pointer to a most-recently written record associated with said in-doubt unit of work on said secondary log.

In a preferred embodiment the further record written comprises entries representing the length of the record, an indication that this is a record having pointers to the most-recently written records on the recovery log and on the secondary recovery log, a timestamp, an identification of the unit of work with which it is associated, a pointer to the most-recently written record associated with said in-doubt unit of work on said recovery log and a pointer to the most-recently written record associated with said in-doubt unit of work on said secondary log.

BRIEF DESCRIPTION OF THE DRAWINGS

An embodiment of the invention will now be described, by way of example, with reference to the accompanying drawings, in which.

DETAILED DESCRIPTION OF THE PREFERRED EMBODIMENT

Figure 1:
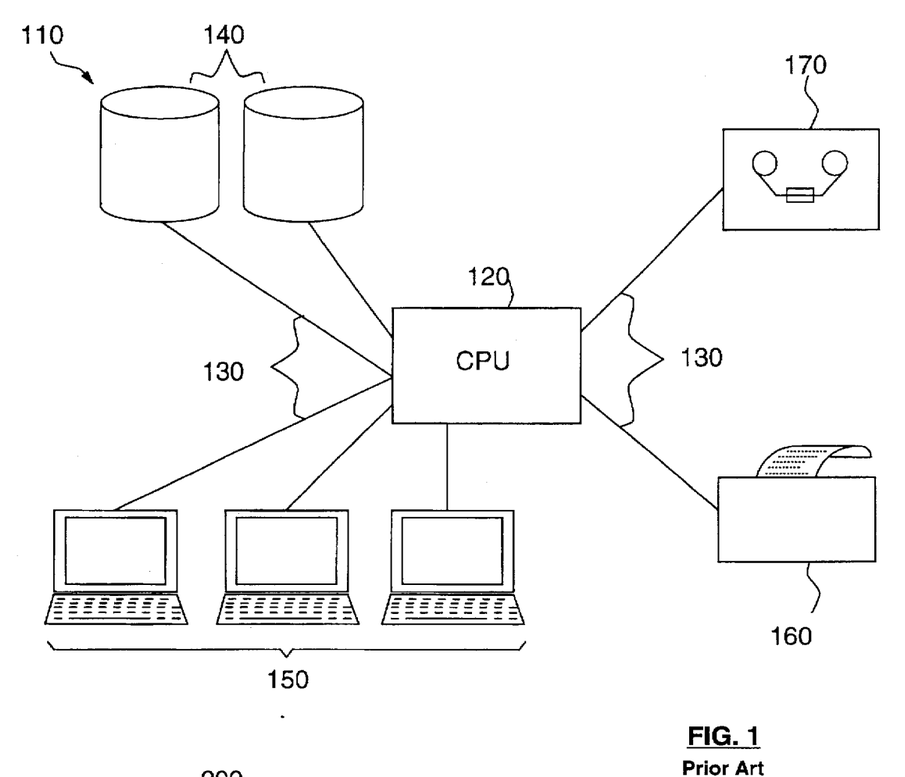
FIG. 1 shows a typical data processor for managing stored data.

FIG. 1 shows a typical example of a data processing system 110 for managing stored data. The system comprises a central processing unit (CPU) 120 which is logically and electrically connected via links 130 to a number of peripheral devices such as disk storage 140, data entry terminals (such as VDU's, EFTPOS terminals etc) 150, a printer 160 and tape storage 170.

Data is stored in an organized manner in data sets on, for example, disk storage 140. In a transaction processing system, updates to the data stored in this way may be initiated in one of several ways such as via a terminal 150, by a system housekeeping task, or by a batch job set up in advance. In a commercial system, it is normal for data to be updated in this manner very frequently. The data processor shown in FIG. 1 may be linked via an electronic network to other data processors, and in fact may have access to data stored at remote locations.

Figure 2:
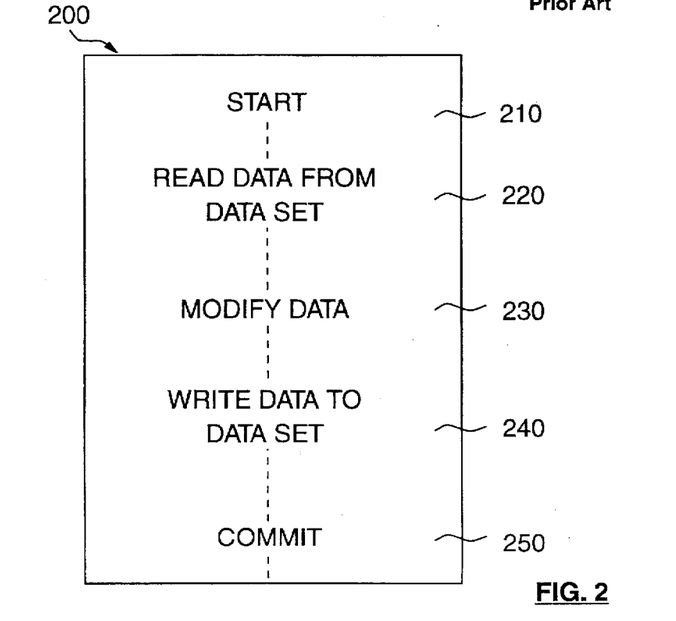
FIG. 2 shows a data update performed by a single Unit of Work (UOW) executing on the data processor of FIG. 1.

Updates to one or more data sets are divided up into units of work. A simplified schematic representation of a single unit of work 200 is shown in FIG. 2. This unit of work 200 comprises five main steps: the start of the unit of work 210; the step of reading data from one or more data sets 220; the step of modifying that data in some way 230; the step of writing that data back out to the data set(s) 240; and the commit point 250.

Updates may be made throughout the unit of work, but are only committed to storage at a single commit point or sync point. This commit point 250 will be at the end of the unit of work. The situation is complicated, however, by the fact that when an update to the data sets is made during the unit of work, the question of whether the update is committed can depend on other resource managers indicating that they are in a position to commit any concurrent updates from the same unit of work made to those other resources. If another unit of work is not in a position to commit, the unit of work is aborted and all of the updates corresponding to that unit of work are backed out, or undone. If the commit point is successfully reached, all of the updates corresponding to that unit of work are committed.

In a commercial system the data being stored and updated may have a very great business value. For example, the data may relate to financial transactions or to product orders. It is therefore important that the data is not lost if a catastrophic processing system failure or an operator error causes the primary copy of the data set to be destroyed.

Figure 3:
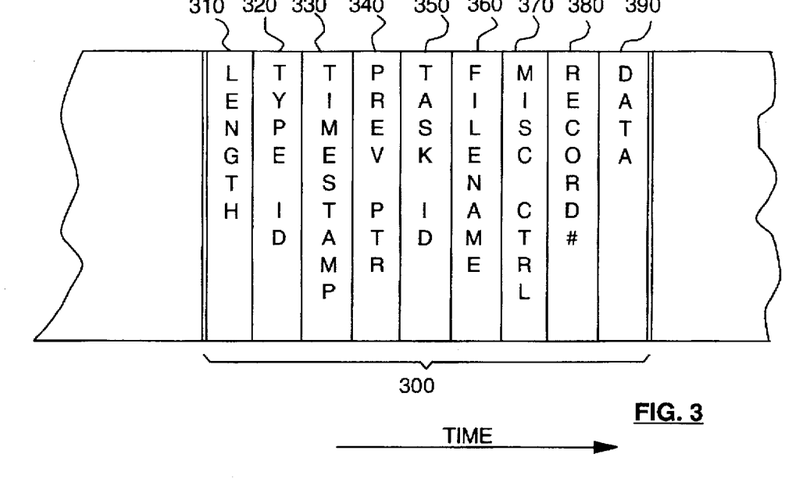
FIG. 3 shows a typical entry on a recovery log used in the data processor of FIG. 1.

FIG. 3 shows a single entry 300 in the recovery log. Whenever a unit of work initiates an update to a data set, an entry 300 giving details of that update is made in the recovery log. The entry contains a number of items of information 310–390 relating to a single update to a single file. The information stored in entry 300 is as follows:

310: The length of the log entry, in bytes;
320: An identification of the type of log entry (e.g. add, delete, modify etc);
330: A timestamp, showing the system date and time at which the log entry was made;
340: A pointer to the previously written log record associated with this unit of work;

350: An identification of the task or job (unit of work) which caused the log entry to be made;

360: The name of the data file to which this entry relates;

370: Miscellaneous control and padding bytes;

380: The record number or address offset, in the file designated by filename 360, to be acted upon; and

390: The data to be written to the file (if applicable).

There may be other log entries, which may include, for example, startup information or entries associated with temporary data storage.

Figure 4:
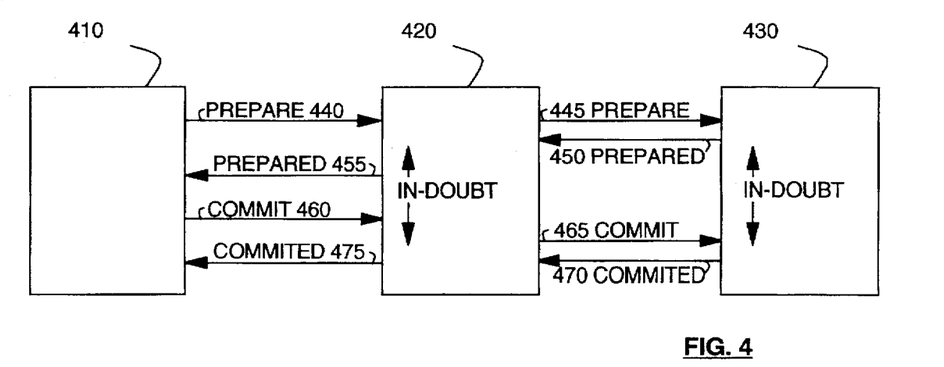
FIG. 4 shows a two phase commit protocol for a unit of work, such as that of FIG. 2, indicating the in-doubt period.

The units of work which wait a long time before completing may include units of work termed in-doubt units of work. FIG. 4 shows a prior art system including an initiator 410 which is so-called because it has initiated a sync point. At the start of the sync point the initiator 410 sends a prepare request 440 to a first resource manager 420. This first resource manager 420 may be utilising resources associated with a second resource manager 430. The first resource manager 420 then initiates a sync point by sending a prepare request 445 to the second resource manager 430. The second resource manager 430 prepares its associated resources and sends a prepared message 450 to the first resource manager 420. The first resource manager 420 prepares its associated resource and responds to the initiator 410 with a prepared message 455.

The initiator 410 then sends a commit request 460 to the first resource manager 420. The first resource manager 420 sends a commit request 465 to the second resource manager 430. The second resource manager 430 commits the changes to its associated resources and responds to the first resource manager with a committed message 470. The first resource manager 420 commits the changes to its associated resources and responds with a committed message 475.

If the first resource manager 420 or the second resource manager 430 are unable to prepare or to commit their associated resources then the relevant messages mentioned above are not sent.

With respect to the first resource manager 420, the unit of work is in-doubt between the time it sent the prepared message 445 to the initiator 410 until the time it receives the commit request 460 from the initiator 410. With respect to the second resource manager 430, the unit of work is in-doubt between the time it sent the prepared message 450 to the first resource manager 420 until the time it receives the commit request 465 from the first resource manager 420.

Figure 5:
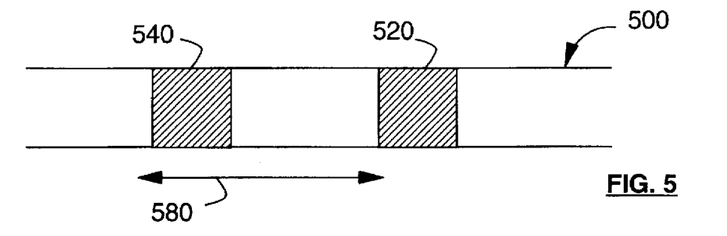
FIG. 5 shows the log records corresponding to the unit of work of FIG. 4.

FIG. 5 shows the log records placed on the log 500 associated with the first resource manager 420 for the message flows of the system of FIG. 4. The second resource manager 430 has a corresponding log associated with it. A prepare log record 540 is placed on the log 500 associated with the first resource manager 420 at the time when the prepared request 455 is sent to the initiator 410 from the first resource manager 420. A commit log record 520 is placed on the log 500 associated with the first resource manager 420 at the time when the commit request 460 is received by the first resource manager 420 from the initiator 410.

The period during which the first resource manager 420 is in-doubt is marked by the two log records 540 and 520 which mark the start of the time when it is prepared to commit (sending of a prepared message 455) and the time when it knows it has to commit (the receipt of the commit request 460). If the first resource manager 420 has only a prepare record 540 on its log 500 for a particular unit of work, then this indicates that the unit of work is in-doubt and must await resolution. If there is a corresponding commit record 520 on the initiator's log 500, then the unit of work is no longer in-doubt.

If a unit of work is in-doubt at a local participant, then such an in-doubt state is frequently associated with awaiting a commit request to be returned from the initiator 410, such as the request 460 awaited by the first resource manager 420 from the initiator 410 (which may be remote from the first resource manager 420) and the message 465 awaited by the second resource manager 430 from the first resource manager 420 (which may be remote from the second resource manager 430). This can be caused by the remote participant being inaccessible from the local participant. Such a state of inaccessibility may last for a long time, and this is a significant cause of log records associated with that unit of work migrating further and further from the current part of the log.

Another type of units of work which wait a long time before completing includes units of work termed backout failure units of work. In backout failure, a backout of uncommitted changes by the use of log records, which would normally be completed promptly is unable to complete because resources from which changes need to be backed out are presently inaccessible. For the purposes of backout, it is assumed that the resources will eventually become available.

Figure 6:
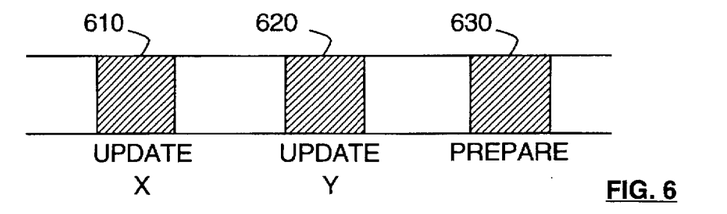
FIG. 6 shows records on a recovery log for a unit of work, such as that of FIG. 2, for which backout has failed.

FIG. 6 shows log records for a unit of work for which a backout failure has occurred. If the backout had been successful, then working from the most recently-written log record, the prepare record 630, back through the log, the updates made to data set Y (documented by record 620) would have been reversed and the updates made to data set X (documented by record 610) would have been reversed. However, assume that a backout failure occurred while trying to backout this unit of work. The data set X was unavailable to have the updates backed out. The data set Y was available and had the updates made to it backed out. This situation of a backout failure can be regarded in two parts. The backout of the changes made to data set Y can be regarded as completed, and this part of the unit of work can be treated as not in-doubt. The backout of the changes made to data set X can be regarded as in-doubt. In this way, the present invention can then be applied to the records representing the updates made to the data set X.

Figure 7:
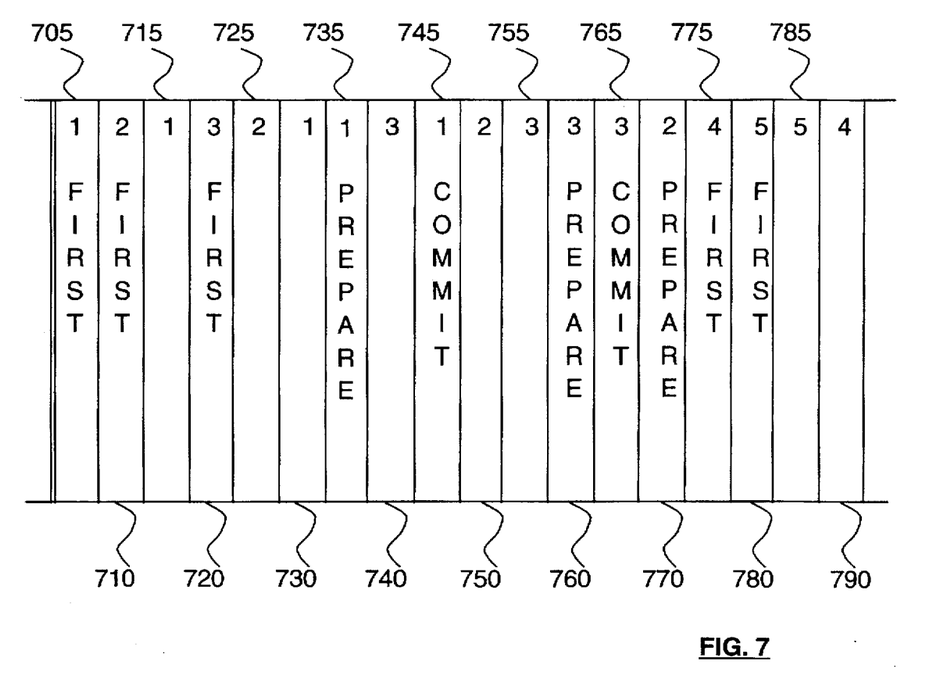
FIG. 7 shows records on a recovery log for a number of different units of work.

FIG. 7 shows a typical log 700 containing log records 705–790 written to the log 700 by five different units of work. In FIG. 7, the unit of work which wrote the log record is indicated at the start of the log record by an identifier in the range from 1 to 5, corresponding to each of the five units of work. The contents of the log record itself are indicated in FIG. 7 below the identifier. Those records, such as 715, 725 which have no contents shown in FIG. 7 are log records which correspond to updates made to data. The contents are not shown for reasons of clarity only.

Log records 705, 715 and 730 correspond to the unit of work having an identifier 1 and represent normal updates to data made by that unit of work. A prepare log record 735 was then written. The unit of work was then committed and a commit log record 745 was written. Similarly, log records 720, 740 and 755 correspond to the unit of work having an identifier 3 and represent normal updates to data made by that unit of work. A prepare log record 760 was then written. The unit of work was then committed and a commit log record 765 was written.

Log records 775 and 790 corresponding to the unit of work having an identifier 4 and representing normal updates to data made by that unit of work were written on to the log. The unit of work having an identifier 4 is still in progress, not having been committed or backed out. Similarly, log records 780 and 785 corresponding to the unit of work having an identifier 5 and representing normal updates to data made by that unit of work were written on to the log. The unit of work having an identifier 5 is still in progress. But units of work 4 and 5 have not been active for a long time and are also not in the in-doubt state described above.

Log records 710, 725, 750 corresponding to the unit of work having an identifier 2 and representing normal updates to data made by that unit of work were written on to the log. The unit of work having an identifier 2 is now in an in-doubt state because a prepare record 770 has been written on the log, but no corresponding commit record has been written. In the event of a system restart, or if it is necessary to backout the changes made by the unit of work having an identifier 2, then all of the log records having an identifier of 2 must be read back to the record indicating that it was the first record for that unit of work, in this case back to record 710.

The first record for each unit of work contains an indication that it is the first record that was written on the log for that unit of work. In FIG. 7, records 705, 710, 720, 775 and 780 are shown as such records. When the log is being scanned from the most-recently written record to the least-recently written record, a FIRST record being encountered means that the log need be scanned no further for records associated with that unit of work.

The preferred embodiment of the present invention copies records associated with units of work which have been waiting for long periods, such as units of work which are in-doubt, from a primary recovery log to a secondary recovery log. It scans the recovery log starting at the most-recently written end looking for log records associated with an in-doubt unit of work. On finding log records associated with such an in-doubt unit of work, it copies these log records onto a secondary log. When it finds a log record, which includes an indication that it was the first log record to be written by that in-doubt unit of work, after having copied this first record, it places a so-called "fork" log record on to the recovery log at the most-recently written end of the recovery log. This fork log record has two pointers, one to the position in the recovery log where the most-recently written log record associated with the in-doubt unit of work can be found, and one to the position in the secondary log where the most-recently written log record associated with the in-doubt unit of work can be found. This log record effectively provides a fork, with the sequence of records associated with the in-doubt unit of work forking to the secondary log, and the sequence of records associated with other units of work continuing on the recovery log.

Figure 8:
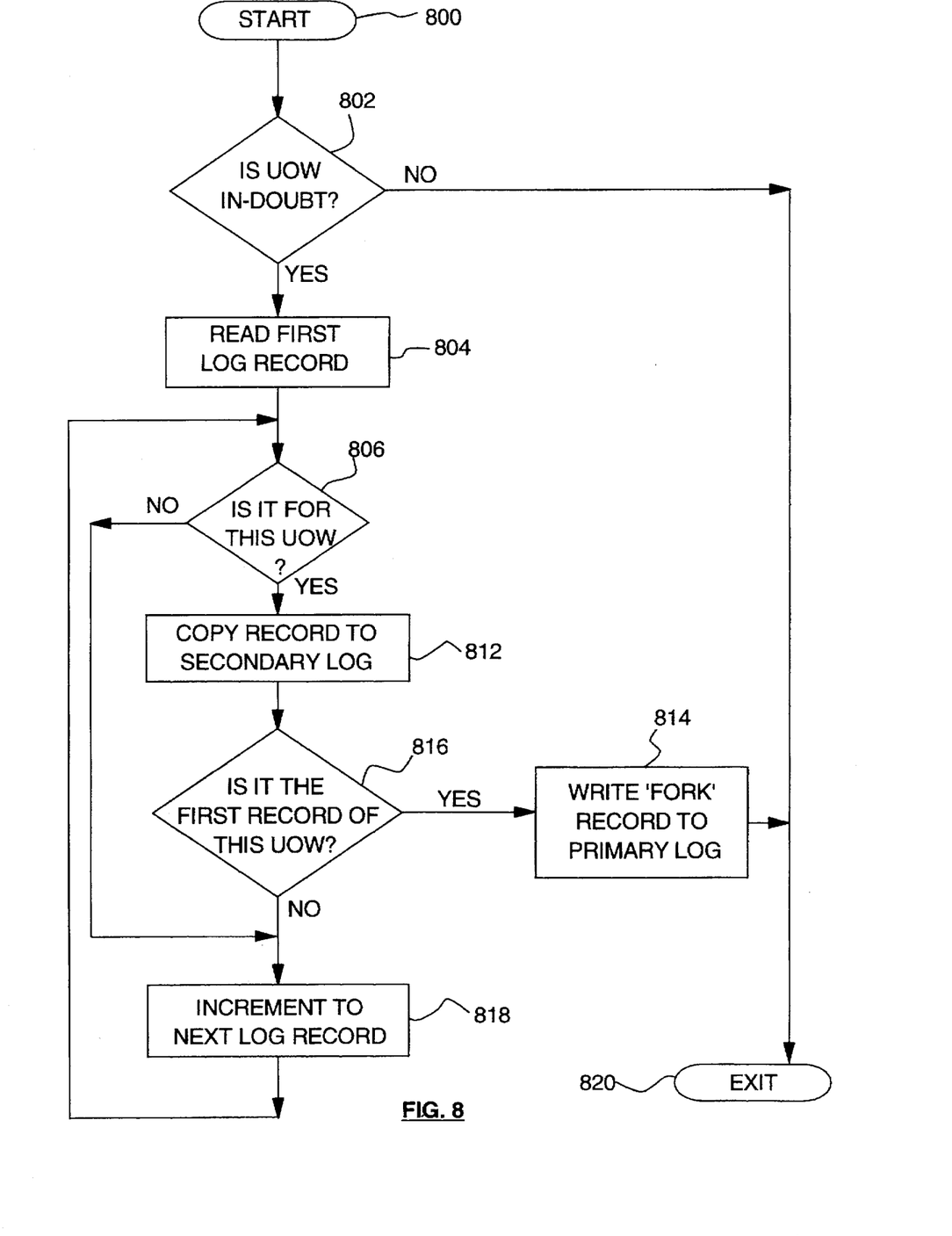
FIG. 8 is a flow diagram of the operation of the present invention on the recovery log of FIG. 7 for in-doubt units of work.

To avoid the necessity to read the log back to the first record having the required identifier, the method of the present invention copies the log records associated with a unit of work which is in-doubt from the log referred to earlier, which becomes known as the primary log, to a different log, which is known as the secondary log. FIG. 8 shows the steps involved in copying the unit of work's log records. At step 802, the status of the unit of work is checked to see if it is in-doubt. As described above, a unit of work is in doubt if a prepare record has been written, but with no corresponding commit record. If it is not in-doubt, then the log records are not to be copied and the routine exits at step 820. If the unit of work is in-doubt, then at step 804 the contents of the first log record are examined.

At step 806 a check is made to see if the identifier for this log record corresponds to the unit of work whose records are being copied. If it is not a log record for this unit of work, the pointer to the current record in the log being examined is incremented at step 818 so as to point to the next record in the log. The routine then returns to step 806 and processes the next log record. If it is a log record for this unit of work, the record is copied to a secondary log at step 812. The record remains on the primary log.

At step 816 a check is made to see if it is the first record placed on the log by the unit of work. As described above with reference to FIG. 7, an indication is used in the log record to indicate a first record written by a unit of work. If it is not the first log record placed on the log by this unit of work, then there are further records on the log to be copied. The pointer to the current record in the log being examined is incremented at step 818 so as to point to the next record in the log.

Figure 10:
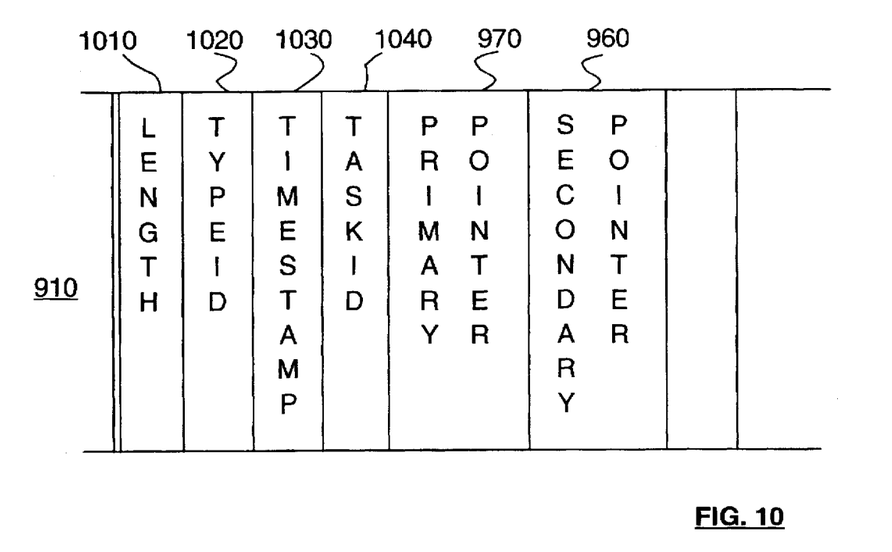
FIG. 10 shows the structure of a fork record used on the primary log shown in FIG. 9.

If it is the first log record placed on the log by this unit of work, then there are no further records on the log to be copied for this unit of work. At step 814, an additional record associated with this unit of work, called a "fork" record, whose structure is described later with respect to FIG. 10, is placed on the log. This record has two effects: to subtract the log records currently on the primary log for this unit of work from the primary log and to refer to the copied records written on the secondary log at step 812 on each iteration around the loop of steps 806, 812, 816 and 818. The routine then exits at step 820.

The additional record for this unit of work written on the primary log, together with the copying of the log records from the primary log to the secondary log, has the effect that a backwards scan of the log during recovery or restart will not need to search for this unit of work's records on the primary log beyond the point where the fork record can be found. When the scan of the log reaches this record, it will know that records for this unit of work are to be found in the secondary log, and no further records need be searched for on the primary log. Records for other units of work may still be found on the primary log after the fork record for this unit of work.

The move of the reference to the log records from the primary log to the secondary log must be performed atomically, that is, it must not be possible for part of it to be completed and part uncompleted. Whilst the records are being copied, the primary log itself has not been modified and in the event of a failure during this process, the primary log data is intact. When the copying is completed, the use of a single operation to (a) subtract the log records currently on the primary log from the primary log contents and (b) to provide a pointer to the secondary log which now contains the log records, means that the data on the primary log will maintain its integrity, regardless of at what point a failure occurs.

Figure 9:
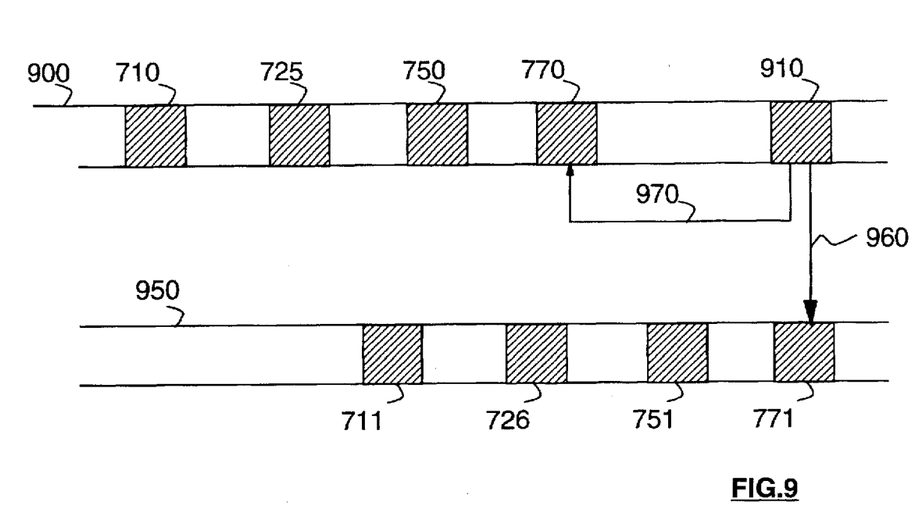
FIG. 9 shows a primary log and a secondary log used in the present invention.

FIG. 9 shows the primary log 900 and the secondary log 950. Log records 710, 725, 750 and 770 on the primary log all correspond to a single unit of work which is in-doubt (This corresponds to the unit of work whose records are depicted in FIG. 7 having an identifier of 2). Log record 770 is a prepare record, log records 710, 725 and 750 are records corresponding to normal updates of data. The method described with reference to FIG. 8 at step 812 was used to copy the log records 710, 725, 750 and 770 from the primary log 900 to the secondary log 950. These are located on the secondary log 950 as records 711, 726, 751 and 771. The different reference numerals have been used for clarity in the diagram only, the contents of log record 710 being identical to that of 711, 725 identical to 726, 750 identical to 751 and 770 identical to 771. Record 910 is a fork record placed on the log by the method described in FIG. 8 at step 814.

The fork record 910 uses pointer 970 within the record to point to the most-recently written record 770 on the primary log 900 for this unit of work. The record 770, pointed to by the fork record indicates the furthest extent to which the primary log 900 need be scanned to find records corresponding to this unit of work. Hence the fork record has the effect of subtracting the log records 770, 750, 725 and 710 currently on the primary log 900 for this unit of work from the primary log 900. The fork record uses pointer 960 within the record to point to the most-recently written record 771 on the secondary log 950 for this unit of work. The record 771 indicates the point at which the secondary log should be scanned from in order to locate records on the secondary log corresponding to this unit of work. The point to which the secondary log 950 should be scanned to is indicated by the indication in record 711 that this is the first record written by this unit of work.

Hence the fork record has the effect of referring to the copied records written on the secondary log. It is called a fork record because for the unit of work with which the fork record is associated, the sequence of log records forks onto the secondary log 950 from the primary log 900. For all other units of work the sequence of log records continues along the primary log.

FIG. 10 shows the structure of a fork record 910 in the recovery log. The entry contains a number of items of information 1010–1040, 970, 960 relating to the unit of work. The information stored in entry 910 is as follows:

1010: The length of the log entry, in bytes;

1020: An identification of the type of log entry (fork record);

1030: A timestamp, showing the system date and time at which the log entry was made;

1040: An identification of the task or job (unit of work) which caused the log entry to be made;

970: A pointer to the most-recently written record on the primary log relating to this unit of work (in FIG. 9, this is to record 770); and 960: A pointer to the most-recently written record on the secondary log relating to this unit of work (in FIG. 9, this is to record 771).

If there are multiple units of work which have been waiting a long time, such as any unit of work which is in-doubt, or units of work which have suffered a backout failure and which may be regarded as at least partially in-doubt, then there may be a fork record for each of these units of work. The fork record corresponding to each unit of work will have the two pointers 960, 970 described above pointing to records for that unit of work on the primary and secondary logs respectively. With the use of a fork record for each unit of work which has been waiting a long time, the active length of the primary log is decreased so that when the primary log is used for recovery purposes, the number of records to be examined is reduced. When the fork record is reached, then the records associated with one of these units of work can be found quite quickly because the secondary log only includes current log records for such units of work.

We claim:

1. A method of managing records, associated with units of work, on a recovery log, the method comprising the steps of:

for each unit of work having records stored on the recovery log, checking whether that unit of work is in an in-doubt state;

for each of said units of work which is in an in-doubt state, scanning the recovery log for records associated with said in-doubt unit of work;

on finding a record associated with said in-doubt unit of work, copying said record to a secondary recovery log;

on finding the earliest-written record for said in-doubt unit of work, writing a further record on to the recovery log, associated with said in-doubt unit of work, the record having the effects of subtracting the log records currently on the recovery log associated with the indoubt unit of work from the recovery log and of referring to the copied log records associated with the in-doubt unit of work written on the secondary log.

2. A method as claimed in claim 1 wherein the log records currently on the recovery log associated with the in-doubt unit of work remain on the recovery log.

3. A method as claimed in claim 1 wherein a unit of work has suffered a backout failure, due to non-availability of one of a plurality of resources requiring updates to be backed out.

4. A method as claimed in claim 1 wherein said step of checking whether a unit of work is in an in-doubt state comprises checking that the most-recently written record on the recovery log is a prepare record.

5. A method as claimed in claim 1 wherein the earliest-written record is indicated by a flag within said record.

6. A method as claimed in claim 1 wherein said records for each unit of work stored on the recovery log, comprise information concerning updates made to stored data by said unit of work and information concerning the status of said unit of work.

7. A method as claimed in claim 1 wherein said step of scanning for records associated with said in-doubt unit of work comprises reading each record in sequence on the recovery log, from the most-recently written record and checking the unit of work identification to see if it corresponds to the in-doubt unit of work whose records are being scanned for.

8. A method as claimed in claim 1 wherein:

the effect of subtracting the log records is by means of a pointer to the most-recently written record associated with said in-doubt unit of work on said recovery log; and the effect of referring to the copied log records is by means of a pointer to the most-recently written record associated with said in-doubt unit of work on said secondary log.

9. A method as claimed in claim 8 wherein the log records currently on the recovery log associated with the in-doubt unit of work remain on the recovery log.

10. A method as claimed in claim 8 wherein a unit of work has suffered a backout failure, due to non-availability of one of a plurality of resources requiring updates to be backed out.

11. A method as claimed in claim 8 wherein said step of checking whether a unit of work is in an in-doubt state comprises checking that the most-recently written record on the recovery log is a prepare record.

12. A method as claimed in claim 8 wherein said step of scanning for records associated with said in-doubt unit of work comprises reading each record in sequence on the recovery log, from the most-recently written record and checking the unit of work identification to see if it corresponds to the in-doubt unit of work whose records are being scanned for.

13. A method as claimed in claim 8 wherein the earliest-written record is indicated by a flag within said record.

14. A method as claimed in claim 8 wherein said records for each unit of work stored on the recovery log, comprise information concerning updates made to stored data by said unit of work and information concerning the status of said unit of work.

15. Data processing apparatus for managing records, stored on a recovery log, the apparatus comprising:

a recovery log for storing records, the records being associated with a unit of work;

means for checking which units of work are in an in-doubt state;

means, responsive to the checking means, for processing records associated with units of work which are in an in-doubt state, the means for processing comprising;

means for scanning the recovery log for records associated with said in-doubt unit of work;

means, responsive to said scanning means, for copying said record to a secondary recovery log;

means for finding the earliest-written record for said in-doubt unit of work;

means, responsive to said finding means, for writing a further record on to the recovery log, associated with said in-doubt unit of work, the record having a pointer to a most-recently written record associated with said in-doubt unit of work on said recovery log and a pointer to a most-recently written record associated with said in-doubt unit of work on said secondary log.

16. Data processing apparatus as claimed in claim 15 wherein said further record written comprises entries representing the length of the record, an indication that this is a record having pointers to the most-recently written records on the recovery log and on the secondary recovery log, a timestamp, an identification of the unit of work with which it is associated, a pointer to a most-recently written record associated with said in-doubt unit of work on said recovery log and a pointer to a most-recently written record associated with said in-doubt unit of work on said secondary log.

17. Data processing apparatus as claimed in claim 15 wherein said means for scanning for records associated with said in-doubt unit of work comprises means for reading each record in sequence on the recovery log, from the most-recently written record and means for checking the unit of work identification to see if it corresponds to the in-doubt unit of work whose records are being scanned for.

18. Data processing apparatus as claimed in claim 17 wherein said further record written comprises entries representing the length of the record, an indication that this is a record having pointers to the most-recently written records on the recovery log and on the secondary recovery log, a timestamp, an identification of the unit of work with which it is associated, a pointer to a most-recently written record associated with said in-doubt unit of work on said recovery log and a pointer to a most-recently written record associated with said in-doubt unit of work on said secondary log.

* * * * *